Aug. 3, 1943.  C. A. BICKEL  2,325,733
RAPID TRAVERSE MECHANISM FOR LATHES
Filed Aug. 15, 1940  9 Sheets-Sheet 1

Inventor
CLIFFORD A. BICKEL,
Attorneys

Aug. 3, 1943.  C. A. BICKEL  2,325,733
RAPID TRAVERSE MECHANISM FOR LATHES
Filed Aug. 15, 1940  9 Sheets-Sheet 4

Inventor
CLIFFORD A. BICKEL,
Attorneys

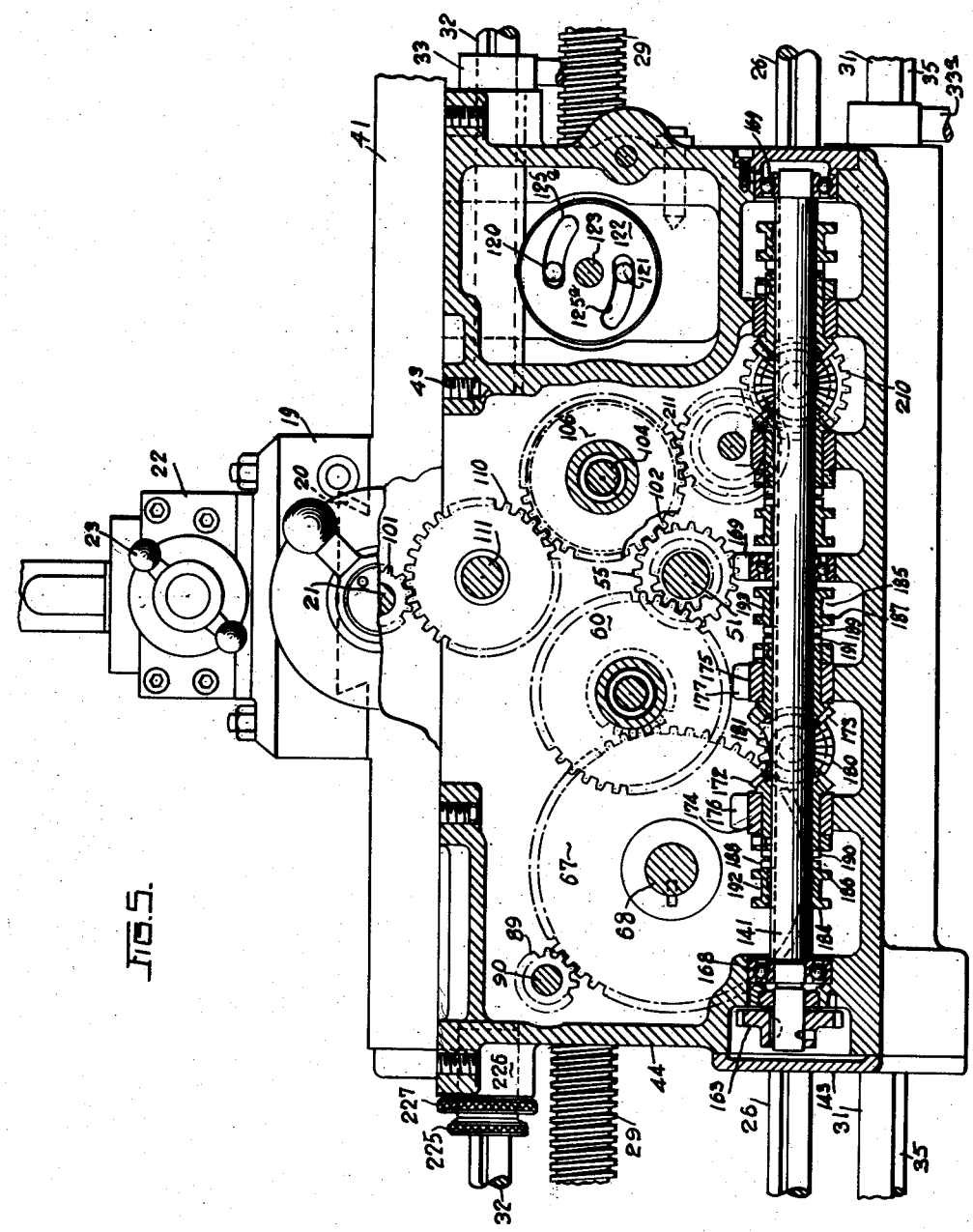

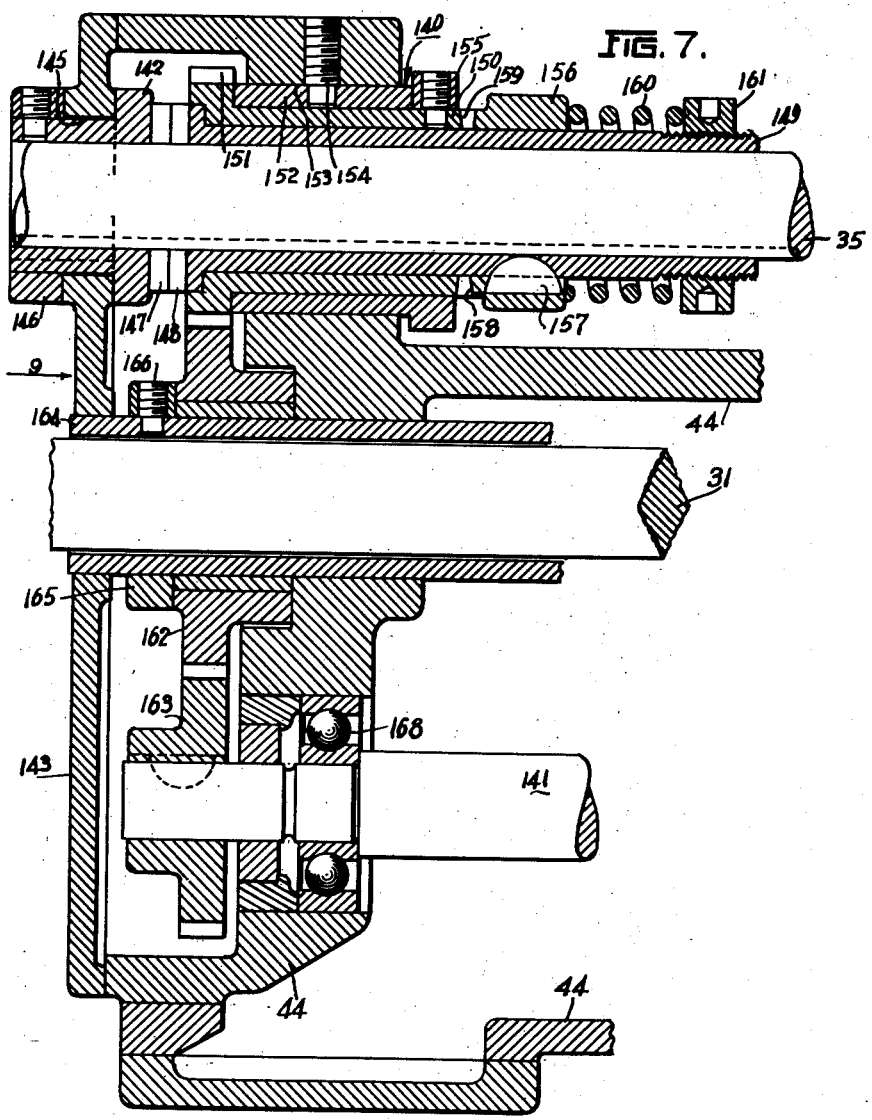

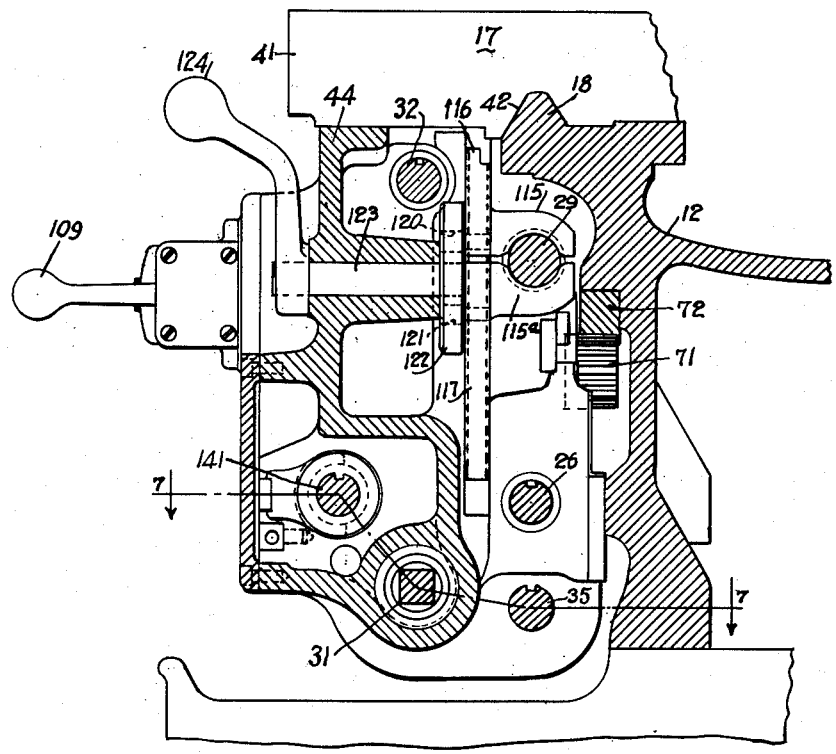
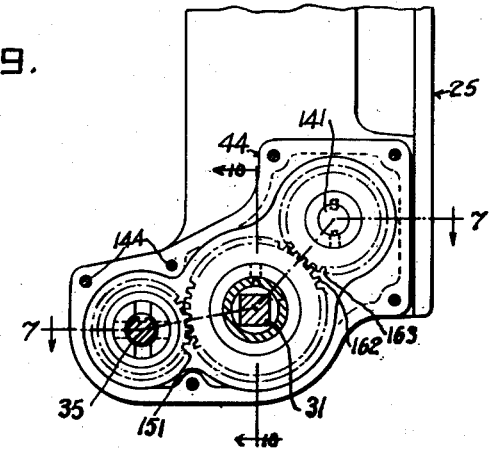

Aug. 3, 1943.    C. A. BICKEL    2,325,733
RAPID TRAVERSE MECHANISM FOR LATHES
Filed Aug. 15, 1940    9 Sheets-Sheet 8

INVENTOR
CLIFFORD A. BICKEL
ATTORNEYS

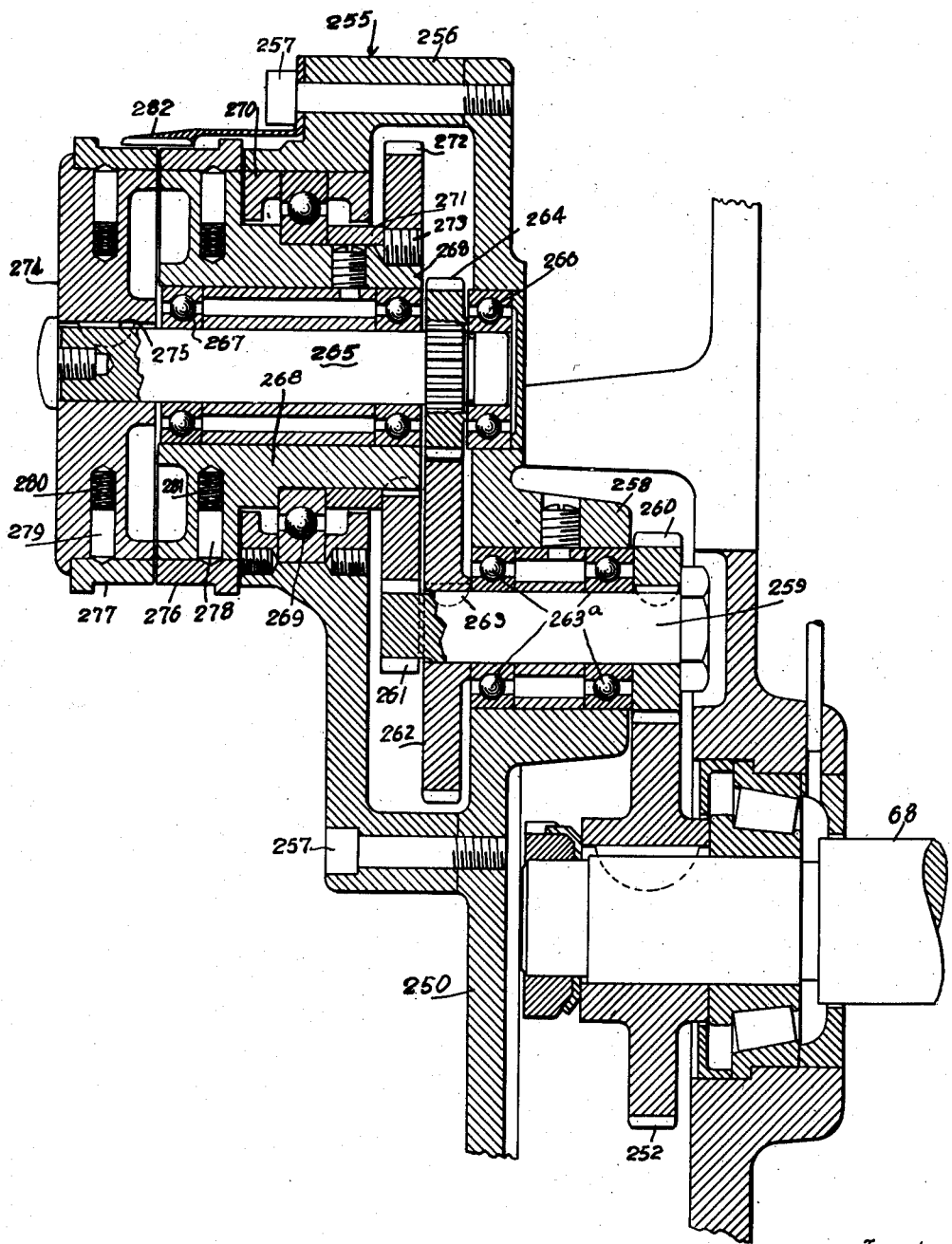

Patented Aug. 3, 1943

2,325,733

UNITED STATES PATENT OFFICE 2,325,733

RAPID TRAVERSE MECHANISM FOR LATHES

Clifford A. Bickel, Sidney, Ohio, assignor to The Monarch Machine Tool Co., Sidney, Ohio, a corporation of Ohio Application August 15, 1940, Serial No. 352,767

19 Claims. (Cl. 82—22)

This invention relates to lathes, or turning machines, and particularly to the apron control and operating mechanism for the lathe.

An object of the invention is to provide an apron for a lathe upon which all of the essential controls for the cutting operations of the lathe are centralized.

Another object of the invention is to provide an operating mechanism within the apron of a lathe carriage for causing rapid traverse of the carriage longitudinally along the ways of the lathe and of the cross slide, which is arranged for transverse movement of the ways of the lathe.

Another object of the invention is to provide a rapid traverse operating mechanism for controlling the longitudinal movement of the carriage, or the transverse movement of the cross slide, in either direction of movement and through the normal driving mechanism for the carriage or cross slide from the feed rod of the lathe.

Another object of the invention is to provide the carriage with a rapid traverse mechanism and to provide means for preventing engagement of the rapid traverse mechanism when the carriage is being driven either by the lead screw or the feed rod of the lathe.

Another object of the invention is to provide a cross feed mechanism and a rapid traverse mechanism for the cross feed, and means to prevent engagement of the cross feed simultaneously with engagement of the rapid traverse mechanism for the cross feed.

Another object of the invention is to provide a mechanism in the apron of a lathe carriage for driving the carriage or the cross slide mechanism thereof, and to provide means therein for increasing the speed of the mechanism temporarily to obtain a rapid traverse of the carriage or cross slide.

Another object of the invention is to provide a lathe apron mechanism wherein a single driving means is used for the longitudinal or transverse movement of a carriage or cross slide respectively, and to use the same mechanism for obtaining a rapid traverse of the cross slide or carriage by increasing the speed thereof.

A still further object of the invention is to provide a lathe carriage having an apron containing means for the normal work drive of the carriage and cross slide and for causing rapid traverse thereof, and having manually operable means for moving the carriage longitudinally of the lathe which includes means for disengaging the manually operable means except when desired to be used.

A still further object of the invention is to provide a lathe carriage having an apron mechanism including a rapid traverse mechanism, and having safety means between the longitudinal rapid traverse mechanism and the lead screw feed mechanism to prevent damage to said mechanisms should they become engaged at the same time.

Another object of the invention is to provide a lathe carriage and apron mechanism for the same having a direct reading scale to indicate the longitudinal travel of the carriage and of the work tool carried thereby.

A still further object of the invention is to provide a lathe carriage having a direct reading scale positioned upon the carriage and driven by the same means which drives the carriage longitudinally along the lathe bed.

A still further object of the invention is to provide a mechanism for reading directly linear measurements of operations performed upon work in a lathe.

A still further object of the invention is to provide a direct reading mechanism for linear measurements of work performed upon a lathe which will read in inches and thousandths thereof of the travel of the carriage upon the bed of the lathe, thus indicating the work tool travel.

A still further object of the invention is to extend all of the control rods for controlling the various functions relative to work operations upon a lathe through the apron of the carriage, whereby control handles, carried by the apron, may interconnect with the control rods with any position of the apron along the length of the lathe bed.

Further objects and advantages may be readily apparent from the drawings and the following description.

In the drawings:

Figure 5 is a vertical cross-sectional view taken substantially along line 5—5 of Figure 3;

Figure 6 is a perspective and somewhat diagrammatic elevational view of the drive mechanism for the longitudinal feed of the carriage and the rapid traverse drive for the longitudinal feed;

Figure 7 is a horizontal cross-sectional view taken along line 7—7 of Figures 8 and 9;

Figure 8 is a vertical cross-sectional view taken along line 8—8 of Figure 2;

Figure 9 is an end elevational view of the gear train between the rapid traverse feed rod and the driven shaft in the apron of the carriage, taken in a direction of the arrow 9 of Figure 7, but having the cover plate removed to show the gear train;

Figure 10 is a partial vertical cross-sectional view taken along line 10—10 of Figure 9 showing the arrangement for extending the start and stop rod through the carriage apron;

Figure 13 is a cross-sectional view of the direct reading linear measurement device;

Figure 14 is a front elevational view of a portion of the carriage showing the interlock device between the longitudinal feed and the rapid traverse feed.

Figure 1:
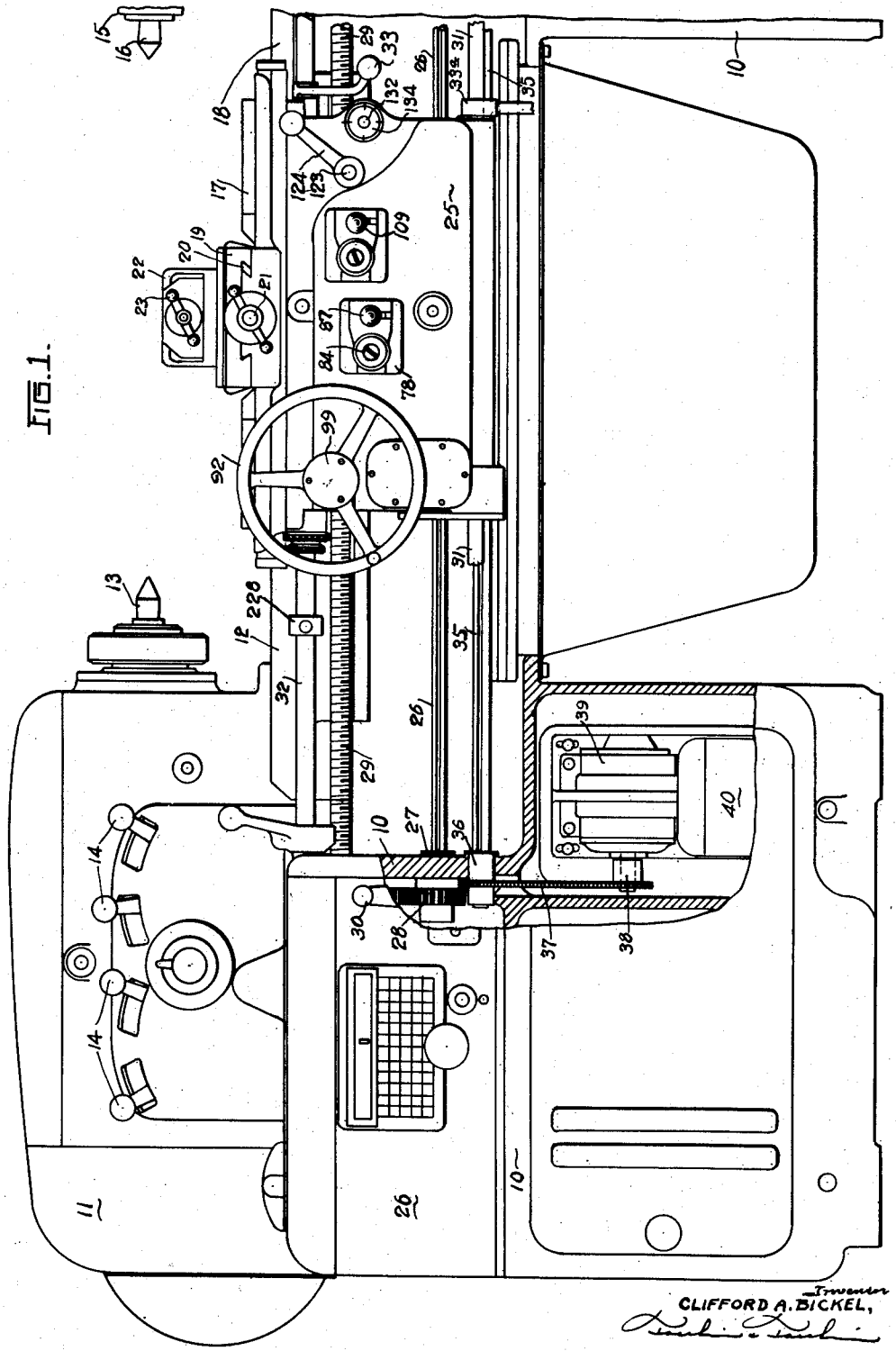
Figure 1 is a side elevational view of a lathe or turning machine showing the positioning of the major elements of the machine.

In this invention the operating controls, essential to the functioning of a lathe carriage and cross slide, are arranged and grouped upon the apron of the carriage so that an operator can start and stop or reverse the lathe from any position the carriage may assume along the length of the lathe bed. The usual mechanism is provided in the apron of the carriage for controlling the feed of the carriage longitudinally along the bed of the lathe, and for controlling the transverse movement of the cross slide upon the carriage. In addition, the apron of the carriage is provided with a mechanism which is adapted to speed up the movement of the carriage or cross slide drive means for returning the carriage or cross slide after completion of a cutting stroke. This mechanism is under the control of the operator through suitable manually operated controls and is arranged so that the rapid traverse of the carriage or cross slide may be obtained in either direction of movement thereof.

In this invention the lathe consists of a supporting frame 10 adapted to rest upon the floor and which is arranged to support a headstock 11 upon the bed 12. A conventional electric motor is positioned within the frame 10 and is interconnected with a driving mechanism within the headstock 11, which headstock mechanism may be of any conventional construction. The headstock mechanism is adapted to drive the lathe spindle 13, and is provided with means for controlling the operating speed of the spindle 13, such as the speed control handles 14 extending externally of the headstock 11. At the opposite end of the lathe bed 12 a tailstock 15 is mounted upon the bed of the lathe in a manner not shown and carries a suitable dead center 16. The tailstock 15 is mounted upon the bed 12 of the lathe in any suitable conventional manner, and may be locked thereupon in any one of a number of ways well-known in the art.

A carriage 17 is mounted upon the bed 12 of the lathe and is guided thereupon by means of the longitudinally positioned ways 18. The carriage 17 is provided with a cross slide 19 mounted thereupon in conventional manner, as by the dovetail shaped guideway 20. The cross slide 19 has a manually operated feed driving means 21 which operates the cross feed screw (not shown) to move the cross slide 19 transversely of the carriage 17.

A compound tool rest 22 is suitably mounted upon the cross slide 19 and is provided with a manually operated feed device 23. A suitable tool post (not shown) may be mounted upon the compound tool rest 22 and is carried thereby in the movement of the compound tool rest.

The carriage 17 is provided with an apron, generally designated by the numeral 25, which is mounted to the under side of the carriage 17 and supported thereby. The apron 25 contains the operating mechanism for moving the carriage longitudinally along the ways 18 of the lathe bed 12 and for moving the cross slide 19 transversely of the carriage 17, the mechanism of which will be hereinafter more fully described.

A feed rod 26 extends longitudinally along the side of the lathe, and is bearinged at one end in the lathe frame 10 as at 27, and at the other end by any suitable means (not shown). The feed rod 26 is provided with a gear 28 on one end thereof which engages the driving mechanism within the headstock 11 and provides means for transmitting power from the mechanism within the headstock 11 to the feed rod 26. The feed rod also passes through the apron 25 of the carriage 17 and engages suitable driving mechanism for operating the mechanism of the apron 25. A lead screw 29 extends from the end of the lathe upon which the headstock 11 is mounted and engages suitable driving means within the headstock 11 for transmitting power therethrough. The lead screw 29 passes through the apron 25 and is caused to be engaged by suitable engaging means by rotation of the control handle 30. A start, stop rod 31 extends from the power end of the lathe and is provided with a control handle 33a mounted thereupon, which handle travels with the apron 25 along the length of the lathe bed 12 to be available at any position of the apron. A lead screw reverse rod 32 also extends from the power end, or headstock end 11, of the lathe and extends through the apron 25 of the carriage 17. This lead screw reverse rod 32 is provided with a control handle 33 which is slidably mounted thereon and carried by the apron 25 so that the handle 33 will be available at any position of the apron 25 of the carriage 17 along the length of the lathe bed 12.

A rapid traverse drive rod 35 is bearinged in the frame 10, as at 36, and at the opposite end by any suitable means (not shown). The rapid traverse drive rod 35 is provided with a sprocket over which a chain 37 is adapted to travel. The chain 37 engages a similar sprocket mounted upon the shaft 38 of a gear reducing head 39 secured upon the electric motor 40, whereby the rapid traverse drive rod 35 is caused to be driven whenever the motor 40 is in operation. A separate electric motor may be provided to drive the rapid traverse rod 35, as shown in the drawings, or the main drive motor for the lathe may be connected thereto. The rod 35 also extends through the apron 25 and drives various mechanisms therein which will be hereinafter more fully described.

The lathe carriage 17 (see Figure 8) consists of a horizontally positioned casting member 41 which is provided with V-shaped grooves 42 on the under side thereof which cooperate with the ways 18 upon the bed 12 of the lathe for longitudinally guiding the carriage 17 thereupon. An apron casting or frame 44 depends from the supporting casting member 41 and is secured thereto by means of suitable bolts 43 (see Figure 5) extending through the casting member 41 into the apron frame 44.

Figure 2:
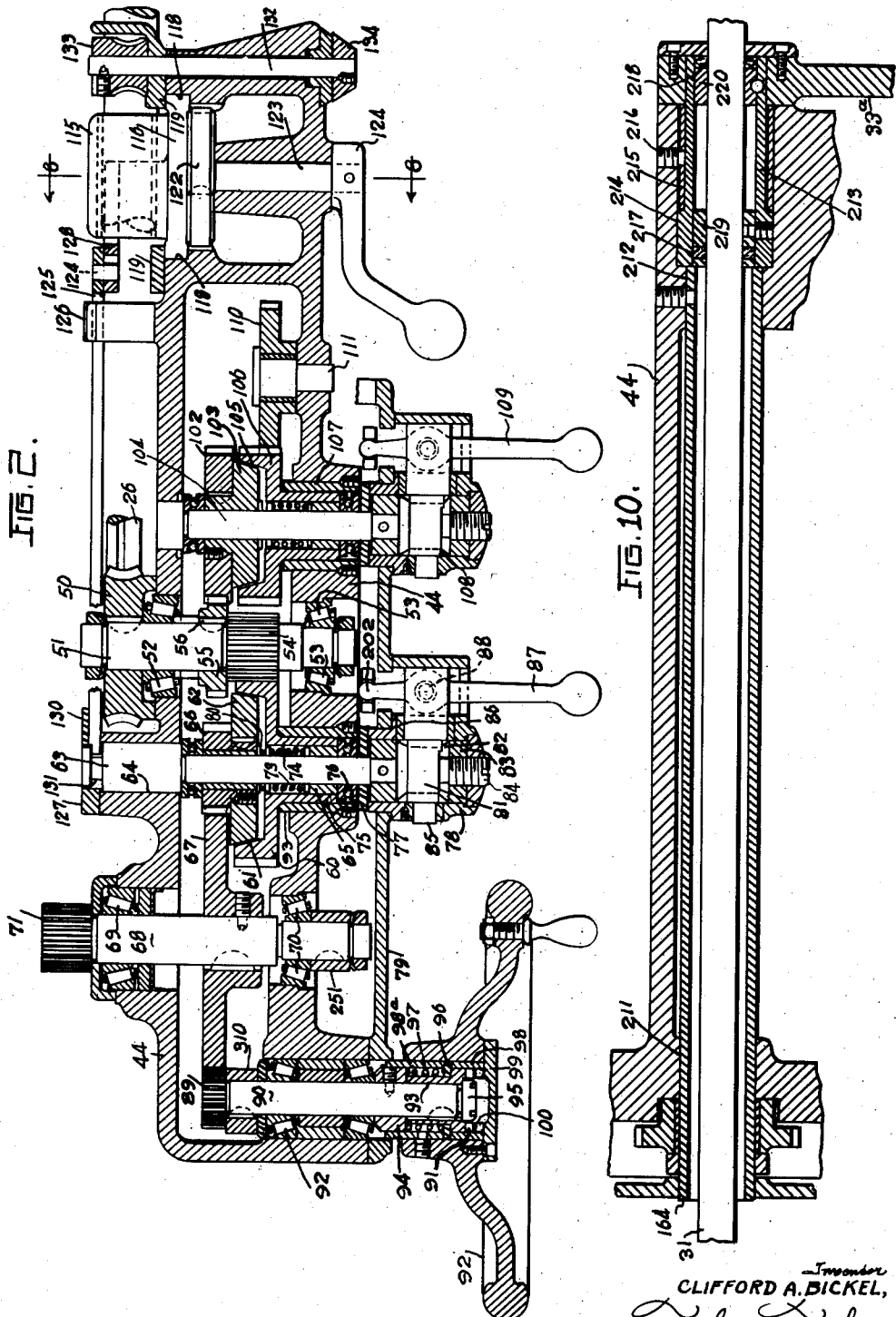
Figure 2 is a horizontal cross-section taken along the line 2—2 of Figure 4, which section has been projected into a plane in order to show the interrelation of the functioning elements of the drive mechanism of the lathe apron control device.

The feed rod 26 (see Figure 3) extends through a boss 45 upon the apron frame 44 and is slidably bearinged therein by means of the bushing members 46. A worm 47 is positioned within the boss 45, which is cored internally, and is slidably arranged upon the feed rod 26, a suitable key (not shown) being provided upon the worm 47 and adapted to slidably engage the key-way 48 in the feed rod 26. The thrust bearings 49 positioned at either end of the worm 47 within the cavity provided within the boss 45 positions the worm 47 within the boss 45 and maintains the position of the worm 47 with respect to the worm wheel 50 (see Figure 2) driven thereby.

The worm wheel 50 is keyed upon the shaft 51 which is mounted in the bearings 52 and 53 provided in the apron frame 44. The shaft 51 has a pinion gear 54 cut as an integral part thereof, and has the spur gear 55 keyed thereon, as at 56. The feed rod 26 driving through the worm 47, the worm wheel 50, the shaft 51, the pinion 54 and the spur gear 55, provides means for transmitting driving power to the longitudinal drive means for the carriage, or the cross slide drive means for the carriage 17.

The longitudinal drive means for the carriage 17 consists of a gear 60 which is in constant mesh with the pinion 54 and is rotated thereby as long as the pinion 54 is rotated. The gear 60 has a recess therein having tapering side walls 61 which are adapted to be frictionally engaged by means of the friction disk 62.

The friction disk 62 and the tapered side walls 61 of the gear 60 provide cooperating faces of a clutch device, to be hereinafter described, for driving the gear 66. The shaft 63 has one end thereof bearinged in the apron frame 44 at 64, and has the other end thereof bearinged in the apron frame at 65, and is slidable transversely in the bearings. The friction disk 62 is keyed to the spur gear 66 which is rotatably mounted upon the shaft 63 and is in constant mesh with the gear 67 mounted upon and keyed to the shaft 68. The shaft 68 is bearinged in the apron frame 44 at one end by means of the roller bearing 69 and at the other end by means of the roller bearing 70. The pinion 71 mounted on the end of the shaft 68 engages the rack 72 secured to the bed of the lathe 12.

The normal drive for the longitudinal feed of the carriage 17 along the ways 18 and the lathe bed 12 is thus through the shaft 51 and the pinion 54 to the gear 60 and through the friction disk 62 to the gear 66, and thus to the gear 67 to the shaft 68 and the pinion 71 to the rack 72. The speed of the feed rod 26 may be varied according to the desires of the operator which will vary the speed of rotation of the pinion 71 upon the rack 72, and thus vary the speed of longitudinal movement of the carriage 17 along the ways 18 of the lathe bed 12.

A clutch member comprising the tapered face 61 of the gear 60 and the friction disk 62 is provided to control the driving engagement between the pinion 54 and the spur gear 66. A compression spring 73 is positioned around the shaft 63 with an internal bore 74 in the shank 75 of the gear 60. The spring 73 has one end thereof engaging the bearing bushing 65 which engages a thrust bearing 76 and a washer 77, which in turn bears against an insert casing member 78 in the cover plate 79 for the apron frame 44, whereby the bearing bushing 65 is retained stationary with respect any movable parts so that the one end of the spring 73 will have a stationary support against which it may expand. The opposite end of the spring 73 engages a thrust bearing 80, which in turn engages the friction disk 62 to cause the friction disk 62 to be disengaged from the tapered wall 61 of the gear 60.

The shaft 63 is adapted to be moved transversely of the apron frame 44 to cause engagement of the friction disk 62 with the tapered wall 61 of the gear 60 by means of an eccentric 81 positioned within a slot 82 of a piston member 83 which is slidably mounted within the insert casing member 78. The eccentric 81 bears upon a pin 84 threadedly engaging a hole in the end of the piston member 83. The eccentric 81 is provided with end bearings 85 and 86 and is adapted to be rotatably mounted in a vertical movement (see Figure 2). The eccentric 81 is provided with a handle 87 pivotally mounted upon a pin 88, the pin being arranged to cause vertical rotation of the eccentric 81 but to permit transverse or horizontal pivotal movement of the handle 87 for purposes to be hereinafter described. It is thus seen that vertical reciprocation of the handle 87, as viewed from the horizontal section of Figure 2, will cause the eccentric 81 to move the pin 84 and thus the piston 83 of the shaft 63 in a transverse direction to cause engagement of the friction disk 62 with the tapered side wall 61 of the gear 60, to thereby provide driving connection between the pinion 54 and the gear 67. The clutch means heretofore described is operable at the will of the operator by means of the handle or lever 87.

To provide a manual control over the longitudinal feed of the carriage 17, there is provided a pinion 89 mounted upon a shaft 90 which in turn is connected through a clutch 91 to the hand wheel 92. The shaft 90 is suitably bearinged in the apron frame 44 by the roller bearings 92. Rotation of the pinion 89 by means of the hand wheel 92 will drive the gear 67 to thus rotate the pinion 71 upon the rack 72 to thereby feed the carriage longitudinally along the ways 18 of the lathe by manual operation.

The hand wheel 92 is connected to the shaft 90 by means of the clutch 91 which consists of a collar 93 keyed to the shaft 90 and retained upon the shaft longitudinally by means of the bearing retaining collar 94 and the nut 95. The collar 93 has a shoulder thereon which supports a washer 96, which in turn provides a bearing face for a compression spring 97 which is retained between the washer 96 and the bearing retaining collar 94. A sleeve 98, consisting of two parts, surrounds the bearing retaining collar 94 and the spring 97. The part 98a surrounds the shouldered portion of the sleeve 93 and provides a spacing member between the washer 96 and the closure plate 99 secured to the hand wheel 92. When the hand wheel is to be used for rotating the shaft 90 and the pinion 89, the hand wheel 92 is moved inwardly to compress the spring 97 so that the clutch teeth 100 will engage, whereby the sleeve 93 will be caused to rotate by means of the plate 99 secured to the hand wheel 92. The spring 97 normally maintains the clutch 91 out of engagement so that the hand wheel is normally stationary and has no effect upon the functioning of any of the driving or driven gears of the apron driving mechanism.

The cross slide driving mechanism is identical with the driving mechanism for the longitudinal feed except that the gear train between the shaft 51 and the cross feed screw pinion 101 (see Figure 5) is slightly different. The gear train in this instance is from the spur gear 55 mounted on the shaft 51 to the gear 102, which is keyed to the friction disk 103 and mounted upon the shaft 104. The friction disk 103 engages the conical face 105 of the gear 106, the friction disk 103 and the conical face 105 providing the clutch engaging face for the clutch means of the cross feed control. The gear 106 is suitably bearinged in the apron frame 44, as at 107, and is provided with a clutch operating means 108 identical in all respects with the clutch operating means heretofore described in connection with the length or longitudinal feed mechanism, which is controlled by means of a handle or lever 109. The gear 106 is in engagement with an idler gear 110 which is bearinged upon a stub shaft 111 mounted in the apron frame 44, and which in turn is in mesh with the cross feed screw pinion 101, whereby the cross feed screw is suitably driven from the feed rod 26. The clutch 108 controls the driving connection between the feed rod 26 and the cross feed screw pinion 101 in the same manner as the clutch heretofore described in connection with the length or longitudinal feed, both of these mechanisms being under manual control of the operator of the machine.

To operate the carriage 17, and longitudinally feed the same by means of the lead screw 29, the half nuts 115 and 115a (see Figure 8) are provided and surround the lead screw 29 and are adapted to bind upon the lead screw 29 in threaded engagement therewith. The half nuts 115 and 115a are carried upon the guide members 116 and 117 which are suitably guided in a vertical direction by means of the guideways 118 provided in the apron frame 44. The guide members 116 and 117 are retained in the guideways 118 by means of the retaining members 119. The half nut 115 has a pin 120 extending therefrom, while the half nut 115a has a pin 121 extending therefrom (see Figures 5 and 8). These pins extend through a cam plate 122, which is keyed to the shaft 123 extending through the front wall of the apron frame 44, and has a handle 124 mounted thereon. The cam plate 122 is provided with arcuate slots 125a in which the pins 120 and 121 are adapted to ride, whereby rotation of the cam plate 122 will cause the pins 120 and 121 to be spread a greater distance apart than shown in Figure 5 to expand the half nuts 115 and 115a to release the lead screw 29.

To prevent the half nuts 115 and 115a from engaging the lead screw 29 while the longitudinal or length feed mechanism is in engagement therewith, an interlock is provided between the operating mechanisms. The interlock consists of a reciprocating bar 125 guided in the brackets 126 and 127 (see Figure 2). The bar 125 is secured at one end to a cam plate 128 carried by the lower half nut 115a and has a vertically inclined slot therein. A pin 124 extends from the bar 125 into the slot of the cam plate 128 whereby vertical motion of the lower half nut 115a is changed to reciprocating motion in the bar 125. Reciprocation of the bar 125 causes the end 130 thereof to engage or disengage a reduced diameter portion 131 of the shaft 63. When the half nuts 115 and 115a engage the lead screw 29 the bar 125 will be shifted to the left (see Figure 2), whereby the end 130 of the bar 125 will engage the reduced diameter portion 131 of the shaft 63 to prevent the shaft 63 from being shifted transversely, whereby engagement of the friction disk 62 with the tapered wall 61 is prevented. Under these conditions it is now impossible to engage a longitudinal feed clutch until the half nuts 115 and 115a have been released.

A thread chasing dial is provided in operative connection with the lead screw 29 and consists of a shaft 132 (see Figure 2) suitably bearinged in the apron frame 44 upon one end of which is mounted a worm 133 in threaded relation with the lead screw 29. The other end of the shaft 132 is provided with a thread chasing dial 134 provided with suitable indices.

The mechanism as heretofore described provides a driving connection between the feed rod 26 and the pinion and rack 71 and 72 or the cross feed screw pinion 101 to drive the carriage 17 and apron 25, either longitudinally along the length of the lathe, or to drive the cross slide 19 transversely of the lathe, according to the desires of the operator, and controlled by means of the clutches for the length or cross feed drive connections. The machine drives, heretofore used on lathes, caused the carriage or the cross slide to be driven by the machine at the same speed in both directions of travel. However, the return of the tool, after the finish of a work stroke, to the beginning of the work stroke is usually a lost motion interval, which if accomplished more rapidly would permit a greater amount of work to be turned over a given period of time. Hence, the lathe apron mechanism of this invention includes a mechanism which is geared to the longitudinal or cross feed drive mechanisms to speed up the operation of the mechanism during the return stroke of the carriage or cross slide.

The rapid traverse mechanism consists of the rapid traverse rod 35, which extends from the frame 10 of the lathe, and is driven by the electric motor 40 at a higher rate of speed than the feed rod 26. The rapid traverse rod 35 extends longitudinally along the lathe through a clutch drive (see Figure 7), generally designated by the numeral 140. The clutch drive 140 is arranged to slide longitudinally along the rapid traverse drive rod 35 as the carriage moves longitudinally along the lathe, and to pick up the power drive from the rod 35 and transmit the power drive to the drive shaft 141 which drives the various mechanisms of the rapid traverse control.

The clutch 140 consists of a clutch driving member 142 which is bearinged in an end plate 143 secured to the apron frame 44. The end plate 143 is secured to the apron frame 44 by the use of suitable bolts 144 (see Figure 9). The clutch driving member 142 extends through bearing bore 145 in the plate 143 and is provided with a collar 146 mounted upon the shank of the clutch driving member 142 to secure the same within the bore 145. The clutch driving member 142 is provided with clutch teeth 147 which permanently engage the clutch teeth 148 provided on the driven clutch sleeve 149.

The clutch sleeve 149 is bearinged internally within the shank portion 150 of the gear 151, which in turn is bearinged within the collar 152 secured within the bore 153 provided in the apron frame 44. The collar 152 is secured in position within the bore 153 by means of the retaining screw 154, and provides a shoulder against which the gear 151 is adapted to thrust in one direction while a collar 155, secured to the shank 150 of the gear 151, provides a thrust collar for oppositely directed thrust.

The sleeve 149 is provided with a clutch collar 156 keyed thereto by means of the key 157, and is provided with a serrated face 158, which serrations form angular teeth. The serrated face 158 cooperates with a correspondingly serrated face 159 provided in the edge surface of the shank 150 of the gear 151, whereby a drive connection is provided between the rapid traverse feed rod and the gear 151 through the clutch driving member 142, the clutch sleeve 149 to the clutch collar 156 and thence to the shank 150 of the gear 151 through the teeth formed by the serrated faces 158 and 159. The clutch collar 156 is constantly urged into engagement with the edge surface of the collar 150 by means of the spring 160 which is retained between the clutch collar 156 and the collar 161 threadedly positioned upon the end of the clutch sleeve 149. This clutch mechanism 140 provides a safety control between the lead screw drive connection and the longitudinal rapid transverse mechanism, the functioning of which will hereinafter be more fully described.

The gear 151 is in constant mesh with an idler gear 162 which in turn meshes with a gear 163 mounted upon the driven shaft 141, upon which shaft the various rapid traverse controls are mounted. The idler gear 162 is bearinged upon a sleeve 164 which extends through the apron, and through which the start, stop rod 31 extends. A retaining collar 165 is pinned to the sleeve 164 by means of the set screw 166 and retains the idler gear in longitudinal position upon the sleeve 164 and adjacent its abutting bearing surface in the apron frame 44.

Figure 3:
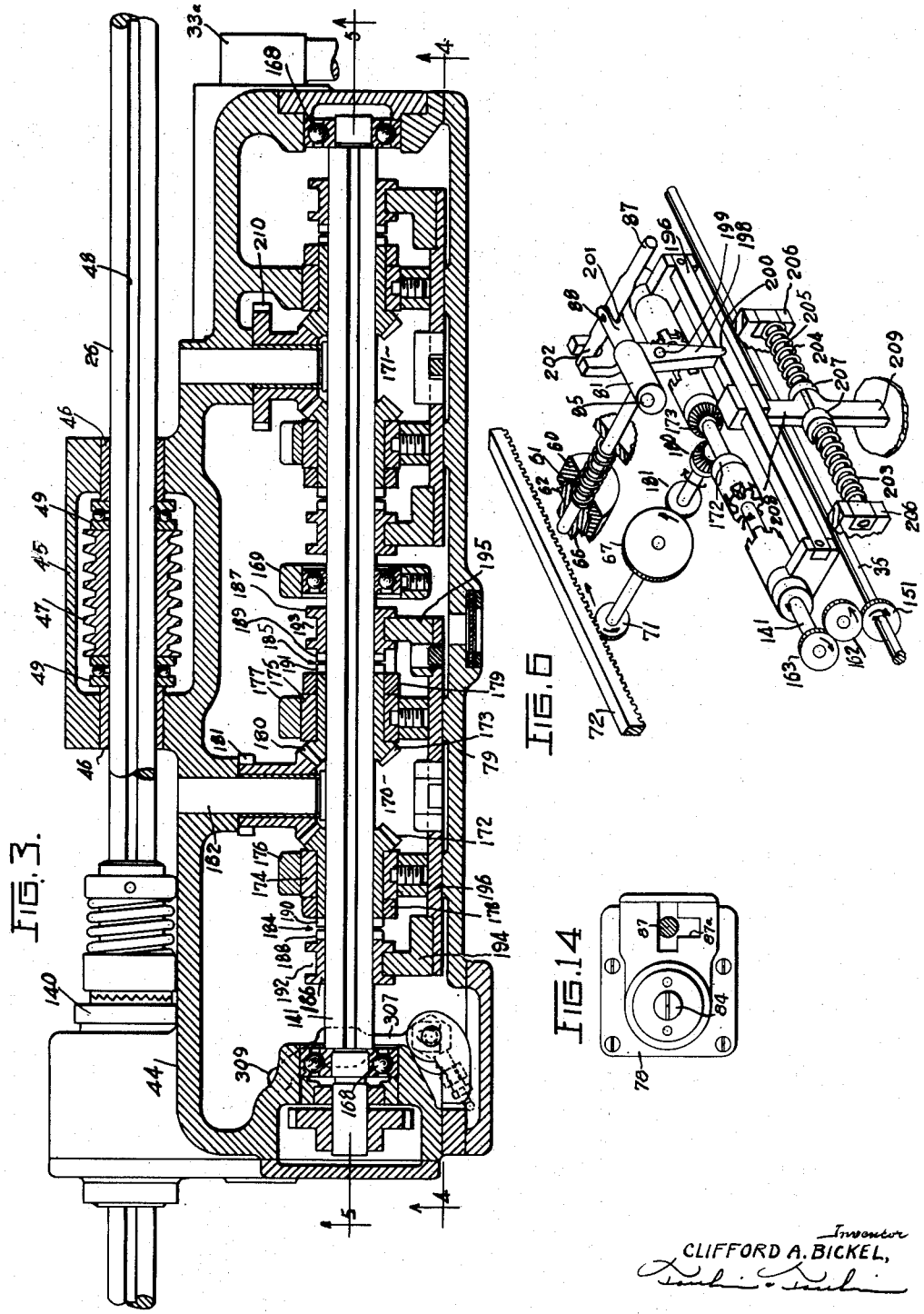
Figure 3 is a horizontal cross-section taken along the line 3—3 of Figure 4 showing the principal elements of the rapid traverse mechanism for the apron control device.

The rapid traverse shaft 141 is bearinged in the apron frame 44 by means of the ball bearings 168 and 169 (see Figures 3 and 5). Two clutch mechanisms, generally designated by the numbers 170 and 171, are mounted upon the drive shaft 141 and are of identical construction. The clutch member 170 provides means for interconnecting the rapid traverse drive rod 35 to the longitudinal drive gear 67 of the carriage 17, while the clutch 171 provides a driving connection to the cross feed clutch gear 106, whereby the rapid traverse drive for either the longitudinal or cross feed is through the normal operating mechanisms for the longitudinal or cross feed of the carriage 17 and cross slide 19.

Only one of the clutch members 170 and 171 will be described, since they are of identical construction, and like numbers will be applied to like parts of the clutch members.

The clutch 170 consists of the beveled gears 172 and 173 which are rotatably mounted upon the drive shaft 141 and are bearinged in the bushings 174 and 175 mounted in the bearing brackets 176 and 177, which bearing brackets are an integral part of the apron frame 44. The retaining collars 178 and 179 are secured to the shank portions of the bevel gears 172 and 173 respectively to position the gears 172 and 173 within the bushings 174 and 175 respectively. The bevel gears 174 and 175 are in constant mesh with a bevel gear 180 which has a pinion 181 on the end thereof. The bevel gear 180 is mounted upon a stub shaft 182 secured within the apron frame 44. The pinion 181 is in constant mesh with the longitudinal feed drive gear 67, which pinion when rotated will feed the carriage 17 longitudinally along the lathe at a more rapid speed than would the normal longitudinal feed mechanism.

When the longitudinal feed mechanism is driving the longitudinal feed drive gear 67 the pinion 181, of the rapid traverse drive, and the bevel gears 180, 172 and 173 are continuously rotated therewith, but are out of driving engagement with the rapid traverse drive rod 141 since the clutch engaging devices 184 and 185 are out of engagement.

The clutch engaging devices 184 and 185 are of identical construction and consist of collars 186 and 187 keyed to the drive shaft 141, and are in sliding engagement with the drive shaft 141 to permit the clutch collars 186 and 187 to slide longitudinally along the shaft 141 to permit engagement of the clutch teeth 188 and 189, provided on the clutch collars 186 and 187 respectively, to engage with the clutch teeth 190 and 191 mounted on the bevel gears 172 and 173 respectively. The clutch collars 186 and 187 are provided with an annular under cut surface 192 and 193 respectively, in which clutch shifting forks 194 and 195 extend. These shifting forks 194 and 195 are mounted upon a slide bar 196 which is guided between the bearing brackets 176 and 177 of the cover plate 79 provided for the apron frame 44. It may readily be seen that the shifting of the clutch forks 194 and 195 by means of the slide bar 196 will permit engagement of either one of the clutch devices 184 and 185 at any one time.

The clutch slide bar 196 is operatively connected with the control handle 87 heretofore described with regard the clutch mechanism for the longitudinal feed of the carriage 17. The operative interconnection is made by means of a lever 198 pivotally mounted at 199, one end of which provides an operating finger 200 which engages the slide bar 196 to cause the same to be reciprocated when the lever 198 is moved by means of the handle or lever 87. The upper end of the lever 198 is provided with a fork 201 in which an extending end 202 of the handle or lever 87 is adapted to be positioned. As previously mentioned, the lever 87 is pivotally mounted upon the pin 88 to permit sidewise reciprocation of the lever 87 whereby the lever 198 will be rotated about its pivot 199 to cause reciprocation of the slide bar 196 and thus engage or disengage the rapid traverse clutch devices 184 and 185.

The handle or lever 87 controls the driving interconnection between the longitudinal feed drive gear 67 with either the normal longitudinal feed or the rapid traverse feed, and, as heretofore mentioned, is reciprocable both vertically and horizontally. Vertical reciprocation of the lever 87 around the axis bearing 85 of the eccentric 81 causes the eccentric to engage the friction disk 82 with the drive gear 60 and thus the gear 66 with the longitudinal feed drive gear 67, whereby the longitudinal feed drive mechanism is in driving control. When the lever 87 is reciprocated downwardly in a vertical direction the extending lever arm enters the vertical portion of a T-shaped slot 87a provided in the casing member 78 (see Figure 14). As long as the arm 87 is in the position to cause engagement of the longitudinal feed rod with the carriage, the rapid traverse mechanism is prevented from engagement. The rapid traverse mechanism can be engaged only when the lever 87 is in the upper position in the T-slot 87a, in which position it can be moved horizontally to shift the shifting lever 198 of the rapid traverse mechanism. This arrangement provides a definite interlock between the normal longitudinal feed drive mechanism and the rapid traverse drive mechanism to prevent simultaneous engagement of the mechanisms with resulting damage to the machine.

Whenever the shifting lever 87 is released the rapid traverse clutch devices 184 and 185 will be shifted to neutral by means of the compression springs 203 and 204. These springs surround a guide rod 205 which is mounted in the stationary brackets 206, one end of the springs 203 and 204 engaging the stationary brackets 206. The opposite ends of the springs 203 and 204 engage the collars 207 positioned on either side of an arm 208 which extends from the slide bar 196. This arm 208 is in alignment with a stationary arm 209 when the clutch members are in neutral position, the collars 207 engaging the stationary bracket to retain the arm 208 in alignment with the bracket 209, and thus retain the clutch devices 184 and 185 in neutral position.

The clutch mechanism 171 engages the rapid traverse drive rod 141 with the cross feed drive gear 106 through means of the gear 210 and the compound idler gear 211 (see Figure 5). The interpositioning of the idler gear between the rapid traverse clutch mechanism 171 and the cross feed drive gear 106 is the only departure of the driving interconnection from the rapid traverse drive rod 141 to the cross feed drive gear 106 from the manner in which the clutch mechanism 170 is connected to the longitudinal feed drive gear 67. The functioning of the clutch mechanism 171 is identical with the functioning of the clutch mechanism 170 and provides the same type of interlock between the normal cross feed drive mechanism and the rapid traverse drive mechanism.

There is no direct interlock between the control for engaging the half nuts 115 and 115a with the lead screw 29 and the rapid traverse feed mechanism for the longitudinal feed, it being readily appreciated that if the lead screw should become engaged simultaneously with engagement of the rapid traverse feed mechanism, for the longitudinal feed, from the high speed rapid traverse drive rod 35, that damage would result to the machine since the two longitudinal feed mechanisms would be completely out of step. If such an occurrence should happen the clutch 140 (see Figure 7) is arranged to release engagement of the rapid traverse drive rod 35 until the half nuts 115 and 115a have been disengaged. The drive from the lead screw is a definite and positive drive, while, as heretofore described, the drive from the rapid transverse drive rod 35 is through the frictionally engaged serrated teeth formed on the collar 156 and the clutch sleeve 150 of the clutch 140. It is thus seen that if the lead screw and rapid traverse rod should both be in engagement simultaneously that the clutch collar 156 will merely slip the serrated teeth over one another until one or the other of the drive mechanisms can be released.

To provide a convenient method for extending the start, stop rod 31 through the apron 25 of the carriage 17, the sleeve 164 (see Figure 10) extends between opposite walls of the apron, internally thereof, and provides means for sealing the passage to prevent leakage of oil from the carriage apron. The sleeve 164 is a pressed fit within the bore 211 and the bore 212 of the apron frame 44. The start, stop rod 31 extends therethrough, the handle 33a thereof being mounted upon a sleeve 213 which is bearinged in the bore 214 provided in one end of the apron frame 44. The sleeve 213 is retained in longitudinal position by means of a spacing sleeve 215 secured to the frame 44 by means of the set screw 216. A packing member 217 is provided at one end of the sleeve 213 while a packing member 218 is provided at the opposite end of the sleeve 213. The packing members 217 and 218 are retained in position by means of suitable bushings 219 and 220 respectively. This arrangement prevents the leakage of oil from the interior of the carriage apron past the control handle 33a.

The lead screw control rod 32 (see Figure 5) extends through an adjusting device which controls the forward advancement of the carriage and automatic reversal thereof, which device is also mounted upon the apron 25. This adjusting device consists of a knurled and threaded collar 225 which is threaded in the bushing 226 and is provided with a locking nut 227. The collar 225 is adapted to engage the lead screw reverse stop 228 mounted on the lead screw reverse rod 32.

From the foregoing description it is readily seen that all of the normally usable controls for starting and stopping the operation of the lathe, the control of longitudinal and cross feed of the carriage and the control of forward and reverse action from the lead screw, as well as control for the normal engagement of the cross feed or longitudinal feed mechanism, or the rapid traverse feed mechanism, as well as the manual control of longitudinal feed, have all been centralized on the apron of the carriage 17, whereby the operator will have all of the essential controls at his finger tips regardless of the position of the carriage along the length of the lathe.

Figure 4:
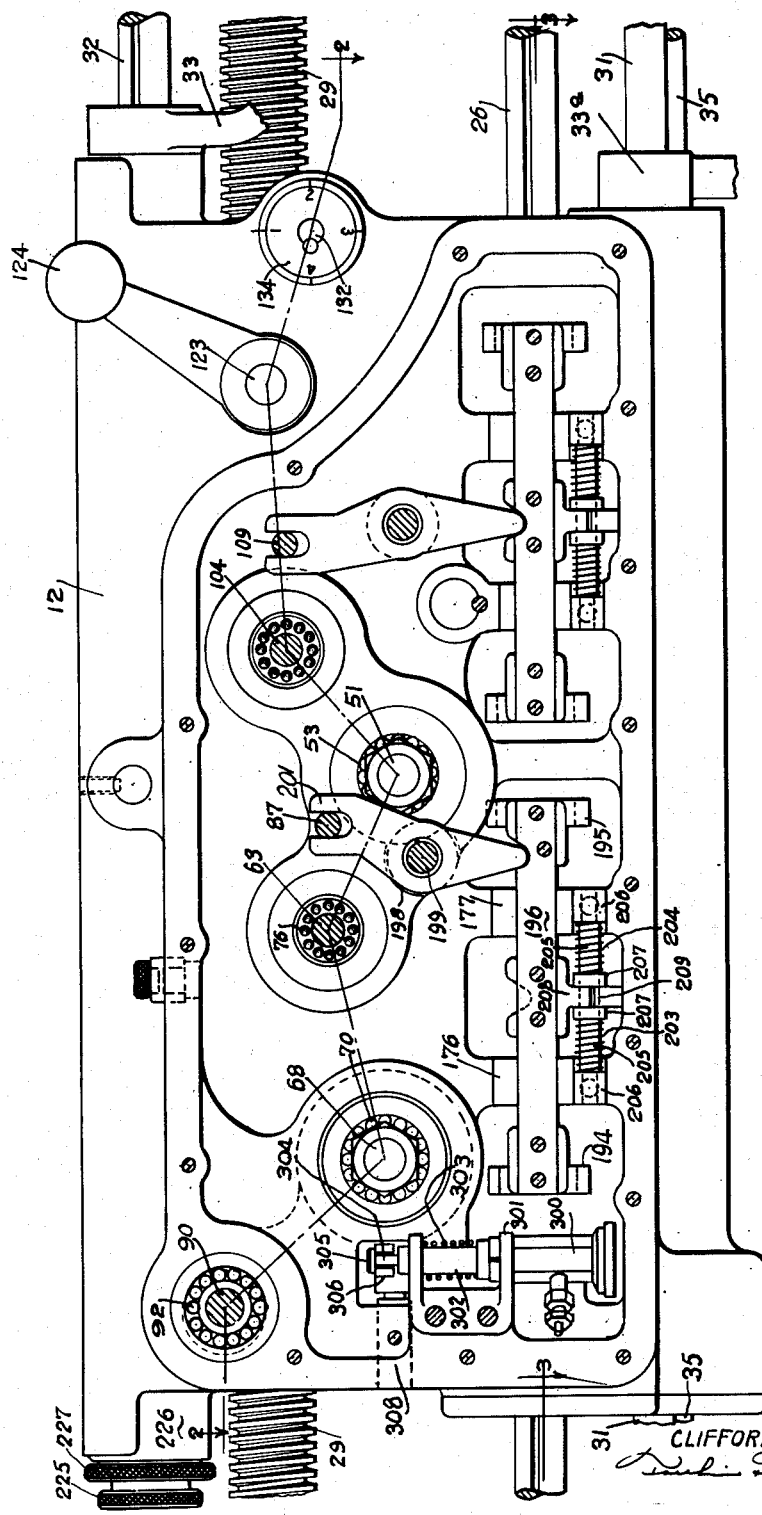
Figure 4 is a vertical cross-sectional view taken along the line 4—4 of Figure 3.
Figure 11:
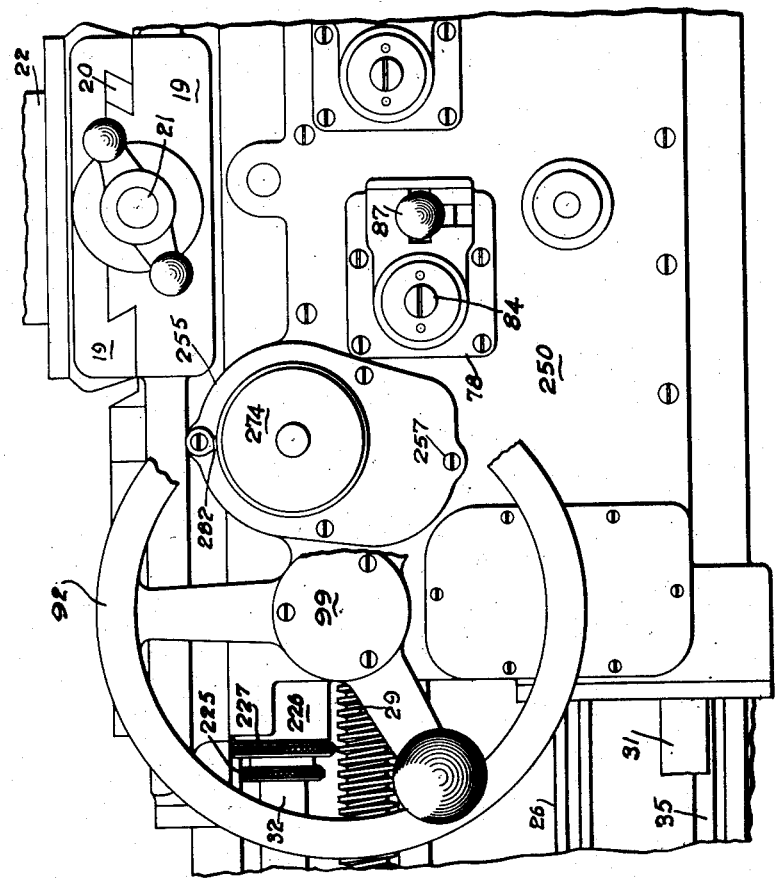
Figure 11 is a partial side elevational view of the lathe carriage and apron showing the positioning of a direct reading linear measurement device.

An oil pump 300 is vertically positioned within the interior of the apron housing or frame 44 upon a bracket 301. The oil pump consists of a piston 302 urged downwardly by means of a spring 303. The upper end of the piston is provided with a reduced diameter portion 304 having a head 305 which engages a fork 306 of a lever 307 (see Figures 3 and 4). The lever 307 is pivoted upon the pin 308. The end 309 of the lever 307 is adapted to engage the under side of the oil pump cam 310 (see Figure 2) mounted on the hand wheel shaft 90. Rotation of the cam 310 will cause downward movement of the end 309 of the lever 307 to pivot the same about the pin 308, thereby lifting the fork 306 of the piston 302. The spring 303 urges the piston 302 downwardly to return the same to its initial position. The pump discharge 311 is connected by suitable pipes and conduits to the various portions and elements of the lathe apron mechanism for lubricating the same.

In this invention I also provide a device mounted upon the apron 25 of the carriage to read directly in linear dimensions of movement of the carriage. The device is directly connected with the longitudinal feed drive shaft 68 for the pinion 71. To mount the direct reading linear measurement device upon the apron 25 of the carriage 17, the cover plate 79 is removed and a different cover plate 250 positioned in place of the cover plate 79, the new plate 250 providing means to support the direct reading linear measurement device. The spacing collar 251 (see Figure 2) mounted on the shaft 68 is removed and replaced by the gear 252 (see Figure 13). It may also be necessary to position the hand wheel 92 a greater distance from the apron 25 to provide sufficient clearance for the casing of the direct reading linear measurement device.

The direct reading linear measurement device, generally designated by the numeral 255, consists of a housing member 256 secured to the cover plate 250 of the apron 25 by means of the bolts 257. The cover plate 250 is provided with a boss 258 thereon in which there is bearinged a shaft 259 which carries a gear 260 on one end thereof. The gear 260 is keyed to the shaft 259 while the pinion 261 is formed as an integral part thereof. The shaft 259 also carries a gear 262 which is keyed thereto by any suitable means such as the key 263. The shaft 259 is bearinged within a bore provided in the boss 258 by means of the ball bearings 263a. The gear 262 is in mesh with the gear 264 which is mounted upon a shaft 265. The shaft 265 is bearinged at one end in the casing 256 by means of the ball bearings 266 and also extends through the ball bearings 267 mounted in a dial carrying member 268.

The dial carrying member 268 is bearinged in the frame 256 by means of the ball bearing 269 which is retained in position by means of the retaining rings 270. The bearing 269 is positioned upon the dial carrying member 268 by means of the collar 271 which in turn is secured in position upon the dial carrying member 268 by means of the gear 272 which is keyed to the dial carrying member and pinned thereto by means of the screw 273. The gear 272 is in mesh with the pinion 261 whereby the dial carrying member 268 is rotated by the pinion 261. The shaft 265 carries a dial carrying member 274 which is keyed thereto by means of the key 275 and rotated therewith when the shaft is rotated by means of the gear 264 and the gear 262.

The dial carrying member 268 carries a dial 276 while the dial carrying member 274 carries a dial 277, both of which are rotatable upon their respective dial carrying members and are retained in position by friction pins 278 and 279 respectively. These pins are urged outwardly by means of the springs 280 and 281 respectively. The gear ratio between the dial carrying member 268 and the pinion 71 on the drive shaft 68 is such that the dial carrying member 268 is rotated once for each 12 inches of carriage travel. The dial 276 may thus be calibrated in inches of travel of the carriage 17, the complete rotation of the dial representing 12 inches of travel of the carriage.

The dial carrying member 274 is geared in a proper ratio with the pinion 71 to rotate the dial carrying member 274 one revolution for each inch of carriage travel. The dial 277 may thus be calibrated in parts of an inch of carriage travel, preferably being calibrated in thousandths of an inch.

An indicia marker 282 is provided to permit accurate reading of the graduations on the dials 276 and 277.

Since the dial 276 rotates once for each 12 inches of travel of the carriage, and since the dial 277 rotates once for each inch of travel of the carriage, it may readily be seen that the longitudinal movement of the carriage can be directly read upon the scales of the respective dials in inches and thousandths of an inch, according to the graduations of the dials.

Figure 12:
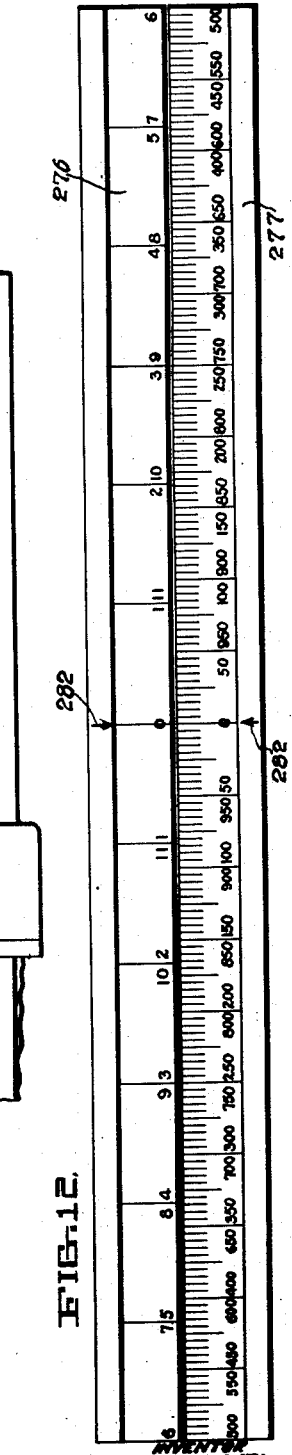
Figure 12 is a projected view of the dials of the direct reading linear measurement device.

A typical dial face is represented by Figure 12, wherein the upper set of figures represents the dial face of dial 276, while the lower set of figures represents the dial face of dial 277, the arrows indicating the indicia marker 282. Since the dial 277 rotates 12 times as fast as the dial 276 it can be seen that for any partial movement of the dial 277, the dial 276 will advance from the indicia marker 282 toward the next consecutive numerical figure, and that the numeral appearing opposite the indicia marker 282 on the dial 277 will represent the exact portion of travel of the dial 276. The dial 276 may thus be read directly in inches, the reading being taken opposite the indicia marker 282, while the dial 277 is read directly in thousandths of an inch, the reading also being taken opposite the indicia marker 282.

When the lathe is placed in operation the main power source drives the lead screw 29 and the feed rod 26 continuously under control of the gearing in the headstock 11, gearing being arranged to vary the speed of rotation of the lead screw 29 and the feed rod 26 to vary the speed of operation of the carriage 17 and the cross slide 19, they being connected through their respective clutches to the feed rod 26, or the carriage 17 being connected to the lead screw by means of the half nuts 115 and 115a. The rapid traverse drive rod 35 is connected to its separate source of power, such as the motor 40, and is in operation whenever the main source of power for the lathe is functioning. To advance the carriage 17 into the work, that is toward the headstock 11, the lever 87 is moved downwardly thereby rotating the eccentric 81 to cause engagement of the friction disk 62 with the gear 60, whereby the pinion 71 is rotated upon the rack 72 to advance the carriage 17 at whatever speed is desired, according to the speed of rotation of the feed rod 26, the gear 60 being driven from the feed rod 26 through the worm wheel 50 and the pinion 54. Upon the finish of the working stroke of the carriage 17 the lead screw reverse stop 228 is contacted and the gearing in the headstock 11 is shifted to cause reverse operation of the feed rod 26 to return the carriage 17 to its normal starting position. This is the normal function if automatic reverse of the carriage is desired, the forward stroke and the automatic retraction stroke of the carriage being carried out at the same speed. However, the rapid traverse mechanism of this invention permits the carriage to be returned to the starting position more rapidly than advanced along the work.

To cause engagement of the rapid traverse drive rod 35 with the rapid traverse mechanism in the apron 25 of the carriage 17, the lever 87 is lifted upwardly to cause disengagement of the longitudinal feed clutch members 60 and 62. The lever 87 may then be shifted to the right, as viewed in Figures 2 and 6, whereby the slide bar 196 will be moved to the right, see Figure 3, thereby causing engagement of the clutch device 184. Assuming the rotation of the rapid traverse drive motor 40 to be in a clockwise direction, the rotation of the gear 181 will be in a clockwise direction whereby the pinion 71 will be rotated counter-clockwise to cause a return stroke of the carriage 17. Upon release of the lever 87 by the operator of the machine the clutch device 184 will be thrown to neutral position by means of the spring 204. While the normal shifting mechanism within the headstock 11 may be used to return the carriage at the same speed it was advanced, the rapid traverse mechanism is always available to return the carriage at high speed, it being necessary, however, to manipulate the lever 87 to engage the rapid traverse clutches which disengage the longitudinal feed clutch.

The cross slide rapid traverse feed functions in an identical manner, the control lever for engaging the clutches of the clutch mechanism 171, being the lever 109. This lever 109 also controls the cross feed clutch member 103.

It is thus seen that the lathe of this invention provides many advantageous features and brings all of the essential controls to the apron of the lathe to permit easy manipulation thereof and to provide a rapid traverse of a return stroke of the carriage or cross feed, while at the same time being able to read the travel of the carriage directly in inches and fractions thereof.

Having thus fully described my invention, what I claim as new and desire to secure by Letters Patent, is:

1. In a lathe, a power source, a carriage, a cross slide, an apron mechanism for said carriage comprising gear trains for drivingly connecting said power source to said carriage feed or said cross slide feed, means for driving said gear trains at a selected speed, clutch means interposed in the gear trains, a second clutch means in said gear trains for drivingly connecting said power source to said carriage feed or cross slide feed at a different speed from said first mentioned means, and a common actuating means for disengaging said first mentioned clutch means when said second mentioned clutch means is engaged.

2. In a lathe, a power source, a feed rod connected to the power source, a carriage, a cross slide, an apron mechanism for said carriage comprising, a gear train for driving said carriage longitudinally, a gear train for driving said cross slide transversely, a common drive means connecting said gear trains to said feed rod, clutch means interposed in each of said gear trains, a second drive means connected to the power source, clutch means interposed between the second drive means and each of said gear trains, and independent actuating means operatively associated with each pair of cooperating clutch means operable as a common control means to selectively control which of said drive means engages said gear trains.

3. In a lathe, a power source, a feed rod a lead screw and a rapid traverse drive rod connected to the source of power, a carriage, a cross slide, an apron mechanism for said carriage comprising means driven by said feed rod for causing longitudinal movement of said carriage and apron upon the lathe including clutch means for controlling the driving engagement, means driven by said feed rod for causing transverse movement of said cross slide upon said carriage including clutch means for controlling the driving engagement, means for engaging said lead screw for causing longitudinal movement of said carriage and apron upon the lathe, means driven by said rapid traverse drive rod for causing a more rapid movement of the carriage or cross slide than can be accomplished by means of the feed rod or lead screw and including clutch means for controlling the driving engagement, and independent means for selectively operating cooperating clutch means having means to prevent concomitant engagement of the carriage or cross slide driving means and the rapid traverse driving means with their respective power sources.

4. In a lathe, a power source, a feed rod a lead screw and a rapid traverse drive rod connected to the source of power, a carriage, a cross slide, an apron mechanism for said carriage comprising means driven by said feed rod for causing longitudinal movement of said carriage and apron upon the lathe including clutch means for controlling the driving engagement, means driven by said feed rod for causing transverse movement of said cross slide upon said carriage including clutch means for controlling the driving engagement, means for engaging said lead screw for causing longitudinal movement of said carriage and apron upon the lathe, means driven by said rapid traverse drive rod for causing a more rapid movement of the carriage or cross slide than can be accomplished by means of the feed rod or lead screw and including clutch means for controlling the driving engagement, and independent lever means for selectively operating cooperating clutch means to control the driven engagement of the carriage or cross slide with the feed rod or rapid traverse drive rod, and means associated with said lever means to prevent simultaneous engagement of the feed rod driving means and the rapid traverse driving means.

5. In a lathe, a power source, a feed rod a lead screw and a rapid traverse drive rod connected to the source of power, a carriage, a cross slide, an apron mechanism for said carriage comprising means driven by said feed rod for causing longitudinal movement of said carriage and apron upon the lathe including clutch means for controlling the driving engagement, means driven by said feed rod for causing transverse movement of said cross slide upon said carriage including clutch means for controlling the driving engagement, means for engaging said lead screw for causing longitudinal movement of said carriage and apron upon the lathe, means driven by said rapid traverse drive rod for causing a more rapid movement of the carriage or cross slide than can be accomplished by means of the feed rod or lead screw and including clutch means for controlling the driving engagement, a separate clutch means interposed between the rapid traverse drive rod and the means driven thereby, said means permitting the rapid traverse drive rod to rotate independently of the means driven thereby when the lead screw engaging means and the longitudinal rapid traverse engaging means are simultaneously engaged.

6. In a lathe, a power source, a feed rod a lead screw and a rapid traverse drive rod connected to the source of power, a carriage, a cross slide, an apron mechanism for said carriage comprising means driven by said feed rod for causing longitudinal movement of said carriage and apron upon the lathe, means driven by said feed rod for causing transverse movement of said cross slide upon said carriage, means for engaging said lead screw for causing longitudinal movement of said carriage and apron upon the lathe, means for engaging said drive rod for causing longitudinal rapid traverse of said carriage, an interlock between said lead screw engaging means and said feed rod engaging means for longitudinal feed to prevent engagement of longitudinal feed while lead screw feed is engaged, and safety clutch means interposed between said drive rod and the means driven thereby to permit the drive rod to rotate independently of the apron mechanism if the lead screw should be engaged by the mechanism driven thereby at any time the rapid traverse mechanism is driving the carriage.

7. An apron mechanism for a lathe carriage and cross slide comprising, a power driven member operable at a determined speed, means for transmitting the determined speed to a longitudinal feed driving member for the carriage, means for transmitting the determined speed to a transverse feed driving member for the cross slide, clutch means interposed in each of the transmission means, a second power driven member, means for drivingly connecting the second power member to the longitudinal or the transverse feed driving members to drive same at a higher speed than the determined speed, clutch means interposed in each of the last mentioned driving connections for the longitudinal and transverse feed driving members, and a single lever means associated with each pair of cooperating clutch mechanisms for the longitudinal and transverse drives respectively to select the driving engagement of either of the power sources with the longitudinal or the transverse feed driving members, and means associated with each of said lever means to prevent concomitant engagement of said mechanisms with said power sources.

8. An apron mechanism for a lathe carriage and cross slide comprising, a power driven member operable at a determined speed, a gear train for transmitting the determined speed to a longitudinal feed driving member for the carriage, a gear train for transmitting the determined speed to a transverse feed driving member for the cross slide, clutch means interposed in each of the gear trains, independent means for selectively operating the clutch means, a second power driven member, gear trains for drivingly connecting the second power member to the longitudinal or the transverse feed driving members to drive same at a higher speed than the determined speed, and clutch means interposed in each of the gear trains from the second power source, said independent means also actuating said last mentioned clutch means.

9. An apron mechanism for a lathe carriage and cross slide comprising, a power driven member operable at a determined speed, a gear train for transmitting the determined speed to a longitudinal feed driving member for the carriage, a gear train for transmitting the determined speed to a transverse feed driving member for the cross slide, clutch means interposed in each of the gear trains, independent means for selectively operating the clutch means, a second power driven member, gear trains for drivingly connecting the second power member to the longitudinal or the transverse feed driving members to drive same at a higher speed than the determined speed, and clutch means interposed in each of the gear trains from the second power source, said independent means also operating said last mentioned clutch means, each of said selecting means being constructed and arranged to prevent concurrent engagement of said power members with said longitudinal feed member or with said transverse feed member.

10. An apron mechanism for a lathe carriage and cross slide comprising, a power driven member operable at a determined speed, a gear train for transmitting the determined speed to a longitudinal feed driving member for the carriage, a gear train for transmitting the determined speed to a transverse feed driving member for the cross slide, clutch means interposed in each of the gear trains, means for operating the clutch means, a second power driven member, gear trains for drivingly connecting the second power member to the longitudinal or the transverse feed driving members to drive the same at a higher speed than the determined speed, clutch means interposed in each of the gear trains from the second power source, independent means for operating said last mentioned clutch means, clutch operating selectors for the longitudinal and transverse feed mechanisms for controlling the driving connection between the respective power sources to the longitudinal feed member or the transverse feed member, said selectors being constructed and arranged to prevent concurrent engagement of said power members with said longitudinal feed member or with said transverse feed member.

11. An apron mechanism for a lathe carriage and cross slide comprising, a power driven member operable at a determined speed, means for transmitting the determined speed to a longitudinal feed driving member for the carriage, means for transmitting the determined speed to a transverse feed driving member for the cross slide, a second power driven member, means for drivingly connecting the second power member to the longitudinal or the transverse feed driving members to drive same at a higher speed than the determined speed, including clutch means interposed between the second power source and the driven feed members, said clutch means being arranged for selection of the direction of motion to be imparted to the carriage or the cross slide, and a feed selecting device associated with each of said longitudinal feed and transverse feed mechanisms, said selecting devices being constructed and arranged to cause engagement of the respective mechanisms actuated thereby selectively with said power sources, for selectively actuating said selective clutches and preventing concomitant engagement of the respective mechanisms with both of said power driven members.

12. An apron mechanism for a lathe carriage and a cross slide comprising, a power driven member operable at a determined speed, means for transmitting the determined speed to a longitudinal feed driving member for the carriage, means for transmitting the determined speed to a transverse feed driving member for the cross slide, a second power driven member, means for drivingly connecting the second power member to the longitudinal or the transverse feed driving members to drive same at a higher speed than the determined speed, including clutch means interposed between the second power source and the driven feed members, said clutch means being arranged for selection of the direction of motion to be imparted to the carriage or the cross slide, and a feed selecting device associated with each of said longitudinal feed and transverse feed mechanisms, said selecting devices being constructed and arranged to cause engagement of the respective mechanisms actuated thereby selectively with said power sources, for selectively actuating said selective clutches and preventing concomitant engagement of the respective mechanisms with both of said power driven members, and means to retain said selecting devices in normal neutral position from which the selection can be made.

13. An apron mechanism for a lathe carriage and cross slide comprising, a power driven member operable at a determined speed, means for transmitting the determined speed to a longitudinal feed driving member for the carriage, means for transmitting the determined speed to a transverse feed driving member for the cross slide, clutch means interposed in each of the transmission means, a second power driven member, means for drivingly connecting the second power member to the longitudinal or the transverse feed driving members to drive same at a higher speed than the determined speed, clutch means interposed in each of the driving connections for the longitudinal and transverse feed driving members, means to selectively engage the respective clutch means to select the driving engagement of either of the power sources with the longitudinal or the transverse feed driving members, said means comprising a single lever to select the direction and speed of feed for the longitudinal feed, and a corresponding lever for the transverse feed.

14. An apron mechanism for a lathe carriage and cross slide comprising, a power driven member, means driven by said power member for longitudinally driving said carriage and including clutch means, a rapid traverse drive rod, clutch means on said drive rod for selecting the direction of movement of the longitudinal feed means when driven by the rapid traverse mechanism, and a selector control having a single operating lever for actuating said control to selectively engage the rapid traverse mechanism and the feeding mechanism with the longitudinal drive for said carriage, for selecting the direction of movement of the carriage when driven by the rapid traverse mechanism, and for preventing concomitant engagement of the rapid traverse mechanism and the normal feed mechanism.

15. An apron mechanism for a lathe carriage and cross slide comprising, a power driven member, means driven by said power member for longitudinally driving said carriage and including clutch means, means for transversely driving said cross slide including clutch means, a rapid traverse drive rod, clutch means on said drive rod for selecting the direction of movement of the longitudinal feed means when driven by the rapid traverse mechanism, and a selector control having a single operating lever for actuating said control to selectively engage the rapid traverse mechanism and the feeding mechanism with the longitudinal drive for said carriage, for selecting the direction of movement of the carriage when driven by the rapid traverse mechanism, for preventing concomitant engagement of the rapid traverse mechanism and the normal feed mechanism, and a similar selector control for selectively controlling the transverse movements of the cross slide.

16. An apron mechanism for a lathe carriage and cross slide comprising a power driven member, means for longitudinally driving said carriage including clutch means for controlling the operation thereof, and a rapid traverse drive mechanism comprising a drive rod, gear means journaled upon said drive rod drivingly connected to said longitudinal drive means for driving the same in either direction, clutch means slidably journaled upon said drive rod for selectively engaging said gear means, means rigidly interconnecting the sliding elements of said clutch means for selectively moving the same into engagement with said gear means, and a selector control for actuating said last mentioned clutch means and the clutch means in the longitudinal drive mechanism, said selector control comprising lever means for shifting said rapid traverse drive clutches, cam means for shifting said longitudinal feed clutch, and a second lever means associated with said first lever means and said cam means for either rotating said cam means or moving said first mentioned lever means but not both in a concomitant operation.

17. An apron mechanism for a lathe carriage and cross slide comprising a power driven member, means for longitudinally driving said carriage including clutch means for controlling the operation thereof, means for transversely driving said cross slide and including clutch means for controlling the operation thereof, and a rapid traverse drive mechanism comprising a drive rod, gear means journaled upon said drive rod drivingly connected to said longitudinal drive means for driving the same in either direction, clutch means slidably journaled upon said drive rod for selectively engaging said gear means, means rigidly interconnecting the sliding elements of said clutch means for selectively moving the same into engagement with said gear means, and a selector control for actuating said last mentioned clutch means and the clutch means in the longitudinal drive mechanism, said selector control comprising lever means for shifting said rapid traverse drive clutches, cam means for shifting said longitudinal feed clutch, a second lever means associated with said first lever means and said cam means for either rotating said cam means or moving said first mentioned lever means but not both in a concomitant operation, and a like selector control for controlling the movements of said cross slide.

18. An apron mechanism for a lathe carriage and cross slide comprising a power driven member, means for longitudinally driving said carriage including clutch means for controlling the operation thereof, means for transversely driving said cross slide and including clutch means for controlling the operation thereof, and a rapid traverse drive mechanism comprising a drive rod, gear means journaled upon said drive rod drivingly connected to said longitudinal drive means for driving the same in either direction, clutch means slidably journaled upon said drive rod for selectively engaging said gear means, means rigidly interconnecting the sliding elements of said last mentioned clutch means for selectively moving the same into engagement with said gear means, and a selector control for actuating said last mentioned clutch means and the clutch means in the longitudinal drive mechanism, said selector control comprising lever means for shifting said rapid traverse drive clutches, cam means for shifting said longitudinal feed clutch, a second lever means associated with said first lever means and said cam means for movement in one direction to rotate said cam means to operate said longitudinal feed clutch and for movement at right angles to the first mentioned movement for shifting said rapid traverse clutches.

19. An apron mechanism for a lathe carriage and cross slide comprising a power driven member, means for longitudinally driving said carriage including clutch means for controlling the operation thereof, means for transversely driving said cross slide and including clutch means for controlling the operation thereof, and a rapid traverse drive mechanism comprising a drive rod, gear means journaled upon said drive rod drivingly connected to said longitudinal drive means for driving the same in either direction, clutch means slidably journaled upon said drive rod for selectively engaging said gear means, means rigidly interconnecting the sliding elements of said last mentioned clutch means for selectively moving the same into engagement with said gear means, a selector control for actuating said last mentioned clutch means and the clutch means in the longitudinal drive mechanism, said selector control comprising lever means for shifting said rapid traverse drive clutches, cam means for shifting said longitudinal feed clutch, a second lever means associated with said first lever means and said cam means for movement in one direction to rotate said cam means to operate said longitudinal feed clutch and for movement at right angles to the first mentioned movement for shifting said rapid traverse clutches, and means associated with said second mentioned lever to prevent movement thereof in both directions concomitantly.

CLIFFORD A. BICKEL.